United States Patent [19]

Enokimoto et al.

[11] Patent Number: 4,817,985
[45] Date of Patent: Apr. 4, 1989

[54] REAR SUSPENSION FOR OFF-ROAD VEHICLE

[75] Inventors: Akito Enokimoto; Tatsuo Masuda; Akio Handa; Eiji Hosoya; Takerou Shibukawa; Seiji Watanabe, all of Saitama, Japan

[73] Assignee: Honda Giken Kogyo Kabushiki Kaisha, Tokyo, Japan

[21] Appl. No.: 98,412

[22] Filed: Sep. 18, 1987

[30] Foreign Application Priority Data

Sep. 18, 1986 [JP] Japan .................................. 61-219938
Oct. 27, 1986 [JP] Japan .................................. 61-255057

[51] Int. Cl.⁴ ............................................... B60G 3/00
[52] U.S. Cl. ..................................... 280/690; 280/701
[58] Field of Search ................. 280/701, 690, 688, 700

[56] References Cited

U.S. PATENT DOCUMENTS

| 4,269,432 | 5/1981 | Inoue et al. ........................ 280/690 |
| 4,641,854 | 2/1987 | Masuda et al. ...................... 280/701 |
| 4,650,210 | 3/1987 | Hirose et al. ........................ 280/690 |

FOREIGN PATENT DOCUMENTS

| 2035307 | 1/1972 | Fed. Rep. of Germany ...... 280/690 |
| 51-104525 | 8/1976 | Japan . |
| 51-109519 | 9/1976 | Japan . |
| 53-17532 | 5/1978 | Japan . |
| 60-134042 | 9/1985 | Japan . |
| 181708 | 8/1986 | Japan ................................... 280/701 |

Primary Examiner—Charles A. Marmor
Assistant Examiner—Ross Weaver
Attorney, Agent, or Firm—Irving M. Weiner; Joseph P. Carrier; Pamela S. Burt

[57] ABSTRACT

An off-road vehicle has a vehicle frame of piping, a power unit including an engine, a fuel tank, an air cleaner, and other components, and a double-wishbone suspension supporting a rear wheel on the vehicle frame. The vehicle frame has a side frame member positioned laterally of the power unit and a rear frame member positioned rearwardly of the power unit. The suspension comprises a knuckle having a proximal end and an upward extension, a lower arm assembly coupled between the proximal end of the knuckle and the side frame member, and a bifurcated upper arm having a vertex end pivotally coupled to the upward extension of the knuckle, a front leg pivotally coupled to the side frame member, and a rear leg being pivotally coupled to the rear frame member.

6 Claims, 7 Drawing Sheets

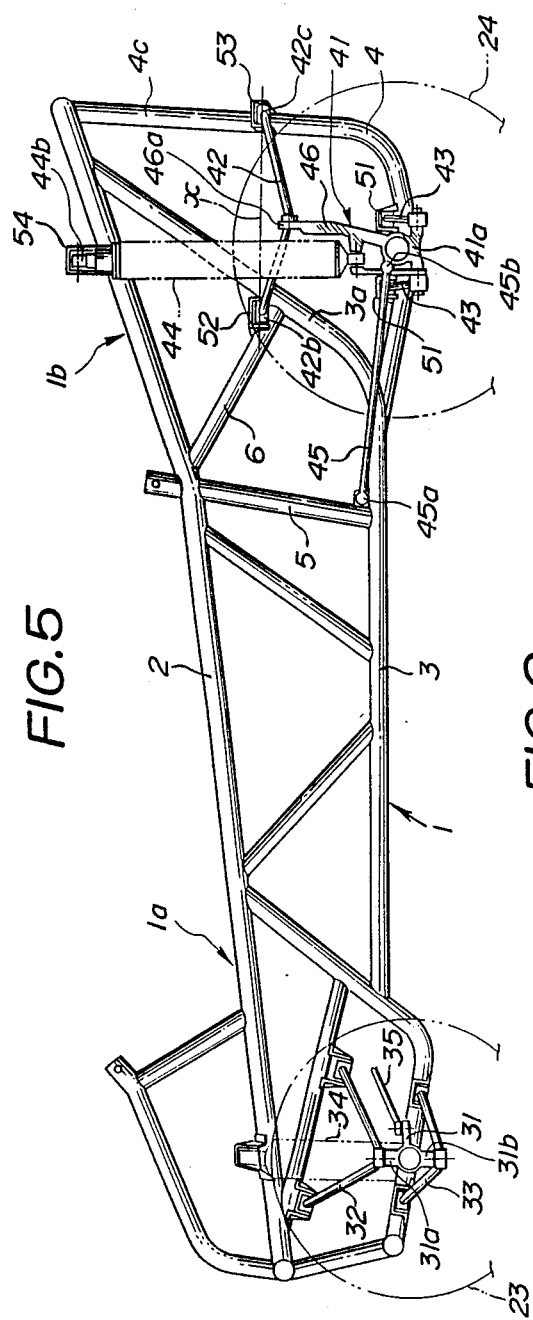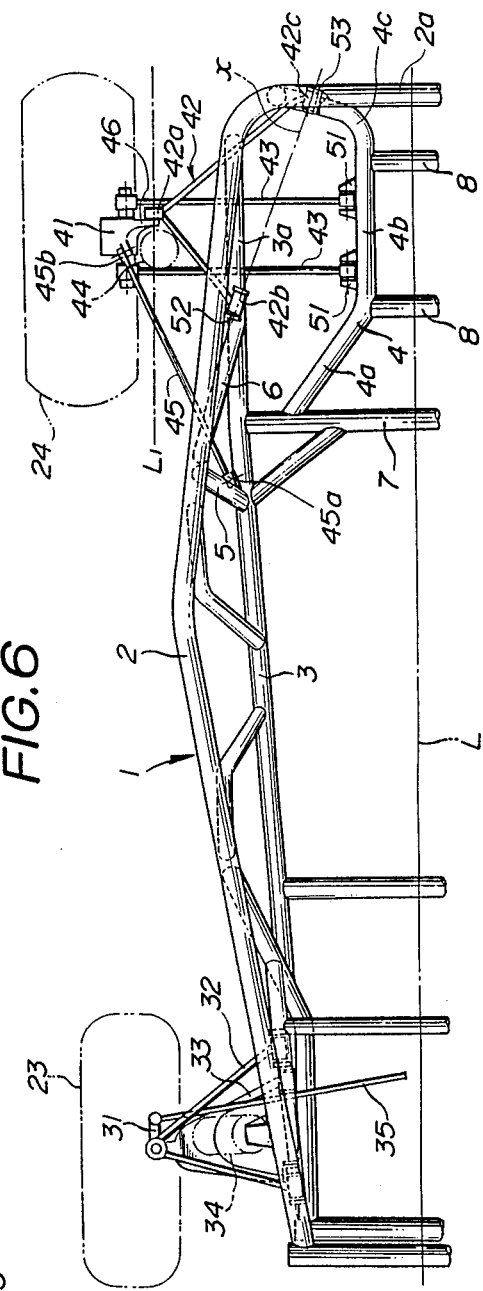

REAR SUSPENSION FOR OFF-ROAD VEHICLE

BACKGROUND OF THE INVENTION

1. Field of the Invention

The present invention relates to a rear suspension for a vehicle, and more particularly to a rear suspension for use in an off-road vehicle.

2. Description of the Relevant Art

Some three-wheeled or four-wheeled off-road vehicles called buggies have a frame of piping supporting an engine, a fuel tank, an air cleaner case, and other components on a rear portion thereof, and rear wheels rotatably supported by rear suspensions on the rear portion of the frame laterally of the engine.

It is desirable that the rear suspensions be structured to give the rear wheels large vertical strokes in order to allow the off-road vehicle to run over rough terrain effectively. The tread of the rear wheels should be as small as possible in order to permit the vehicle to make a smaller turn.

The present invention has been made in view of the aforesaid demands.

SUMMARY OF THE INVENTION

According to the present invention, there is provided an off-road vehicle comprising a vehicle frame of piping, a power unit including an engine, a transmission, an intake and exhaust device, a fuel tank, and a battery, at least one rear wheel, and a suspension supporting the rear wheel on the vehicle frame. The suspension comprises a knuckle by which the rear wheel is rotatable supported, the knuckle having a proximal end and an upward extension, the vehicle frame having a side frame member positioned laterally of the power unit and a rear frame member positioned rearwardly of the power unit, the rear frame member having a vertical pipe, a lower arm assembly coupled between the proximal end of the knuckle and the side frame member of the vehicle frame, and an upper arm having a vertex end and two front and rear legs extending forwardly and rearwardly from the vertex end. The vertex end being pivotally coupled to the upward extension of the knuckle, the front leg being pivotally coupled to the side frame member, and the rear leg being pivotally coupled to the vertical pipe of the rear frame member.

The suspension includes a damper coupled between the knuckle and the side frame member, the damper being disposed in front of and substantially parallel to the upward extension of the knuckle and lying on a line extending substantially parallel to a longitudinal axis of the frame. The damper has a lower end pivotally coupled to an intermediate portion of the upward extension of the knuckle.

With the present invention, the suspension gives the rear wheel a large vertical stroke and reduces the rear wheel tread as much as possible.

The above and further objects, details and advantages of the present invention will become apparent from the following detailed description of a preferred embodiment thereof, when read in conjunction with the accompanying drawings.

BRIEF DESCRIPTION OF THE DRAWINGS

FIGS. 5 and 6 are side elevational and fragmentary plan views of the frame and suspensions;

DETAILED DESCRIPTION OF THE PREFERRED EMBODIMENT

Figure 1:
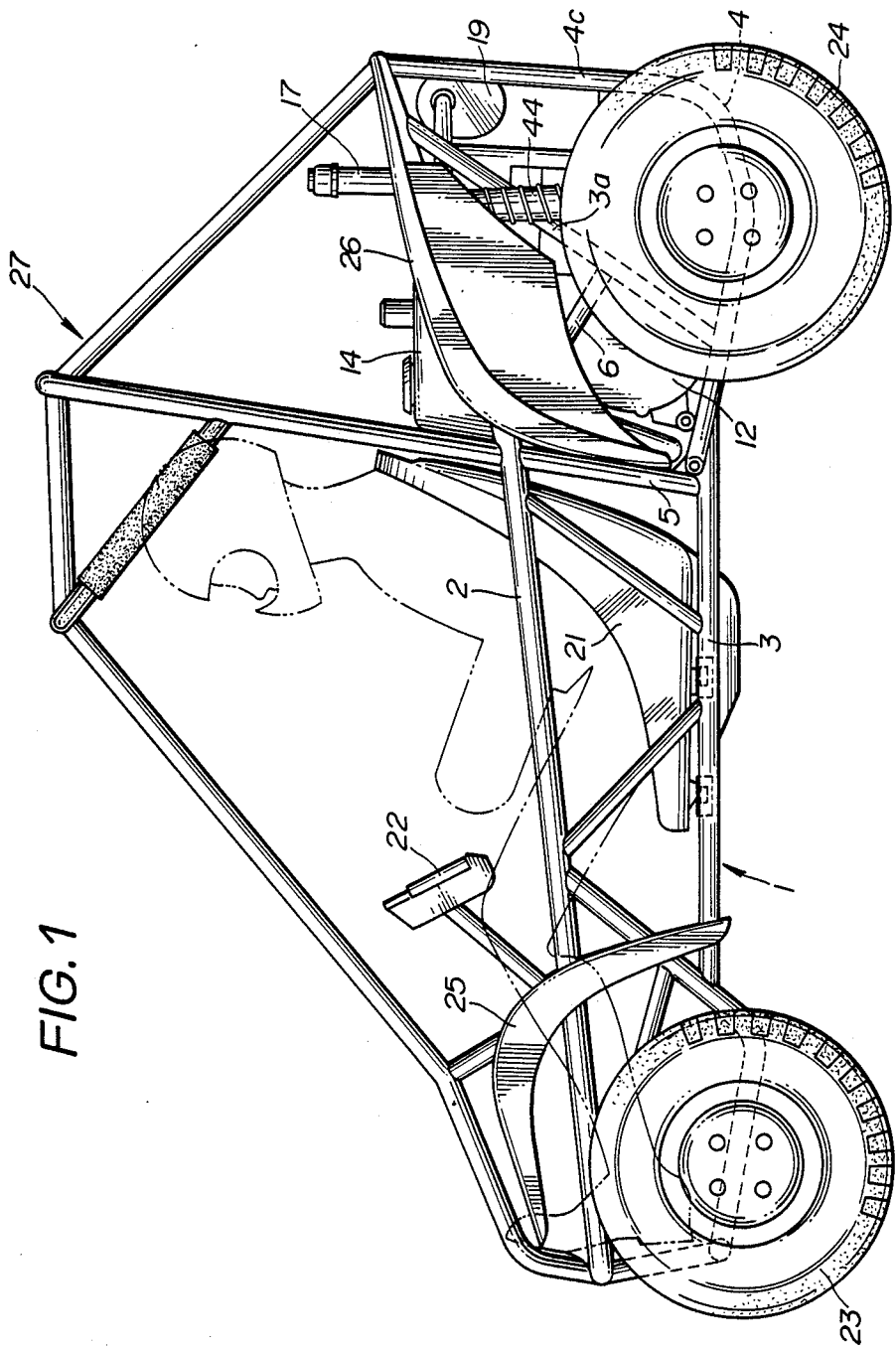
FIG. 1 is a side elevational view of an off-road vehicle having rear suspensions according to the present invention.
Figure 2:
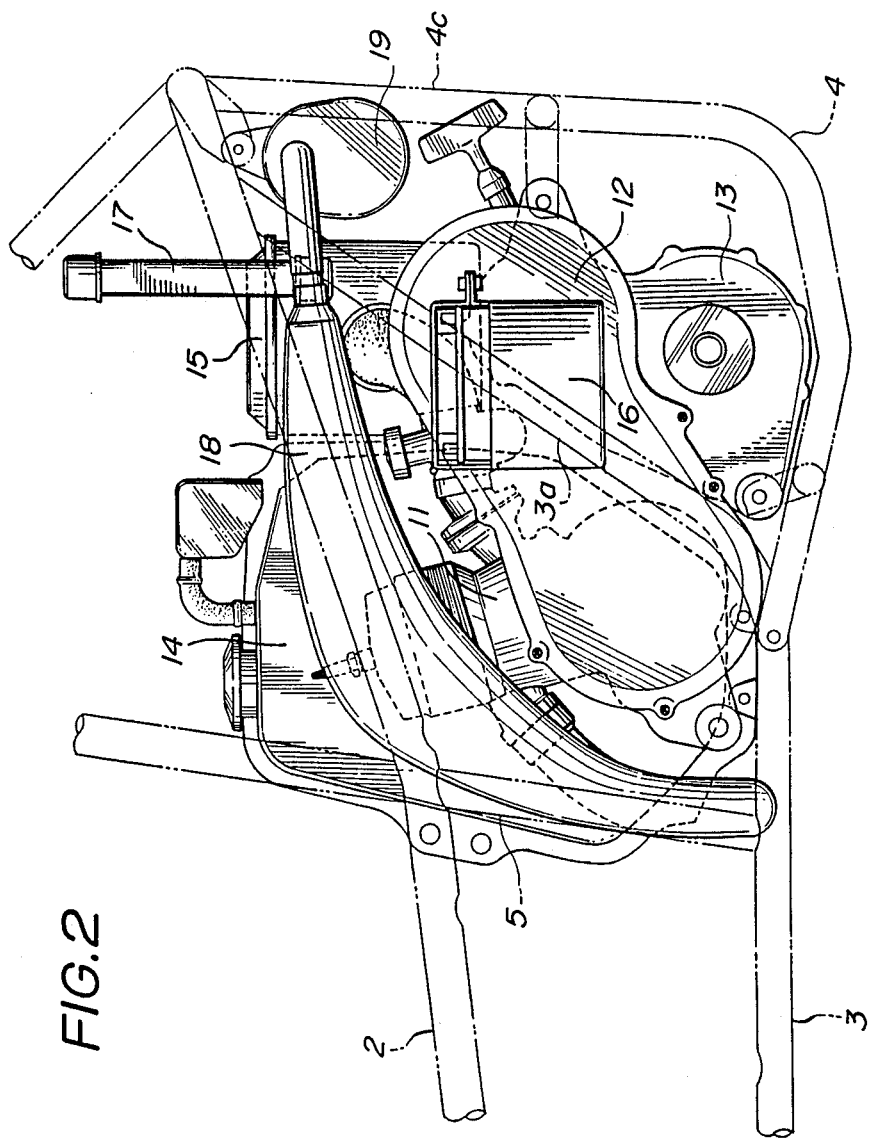
FIGS. 2, 3, and 4 are fragmentary side elevational, plan, and rear elevational views, respectively, showing various components supported on a rear portion of a frame of the off-road vehicle.
Figure 3:
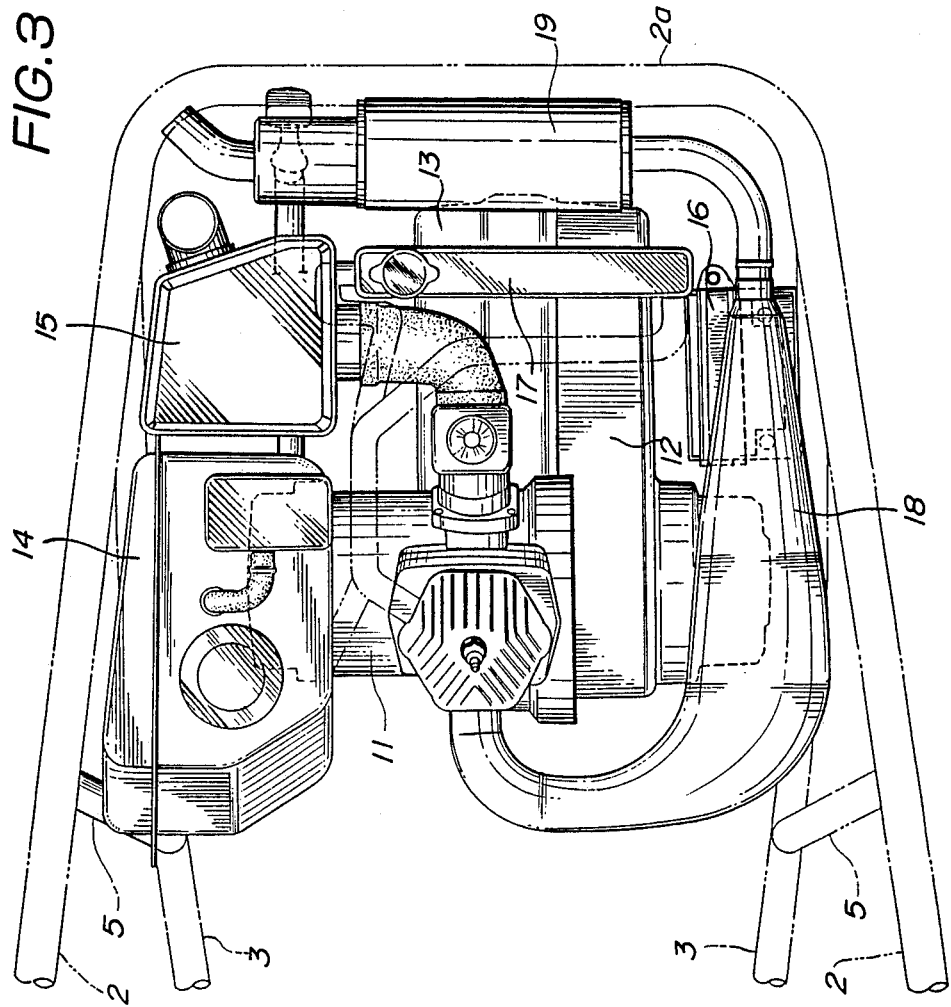
Figure 4:
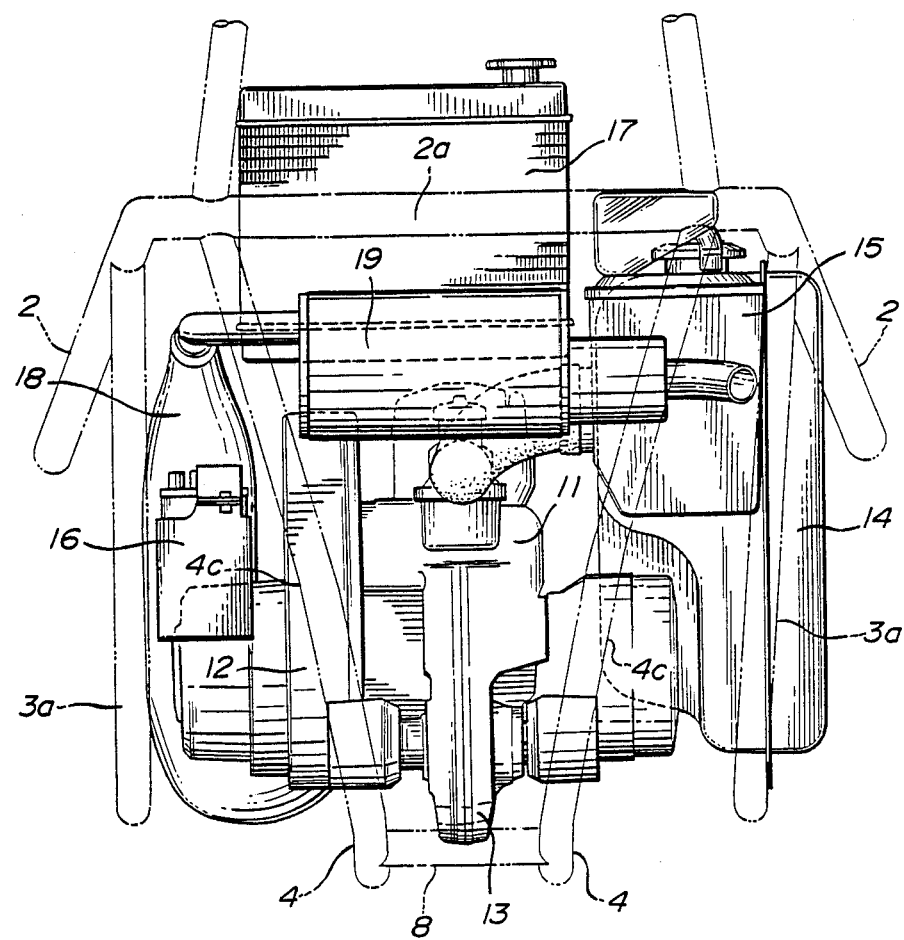

As shown in FIGS. 1 through 4, an off-road vehicle has a frame 1 of piping which accommodates in a rear space thereof a power unit comprising an engine 11, a transmission case 12, a speed reducer case 13, a fuel tank 14, an air cleaner 15, a battery 16, a radiator 17, an exhaust pipe 18, and a muffler 19. A driver's seat 21 is also supported on the frame 1 in front of these components of the vehicle. A pair of front wheels 23 and a pair of rear wheels 24 are rotatably supported respectively on front and rear portions of the frame 1. A steering wheel 22 operatively coupled to the front wheels 23 is disposed in front of the driver's seat 21. Front and rear fenders 25, 26 are fixed to the frame 1 in overhanging relation to the front and rear wheels 23, 24, respectively. A roll bar assembly 27 is coupled to the frame 1 at its upper portion. As indicated by the imaginary line in FIG. 1, a driver seated in the driver's seat 21 has his legs extended into the front space in the frame 1 while driving the vehicle.

As shown in FIGS. 5 and 6, the front and rear wheels 23, 24 are supported on the frame 1 by respective double-wishbone suspensions. More specifically, each of the front wheels 23 is rotatably supported by a knuckle arm 31 having upper and lower ends 31a, 31b coupled to a front portion 1a of the frame 1 by means of A-shaped upper and lower arms 32, 33, respectively. A hydraulic damper 34 is coupled between the front frame portion 1a and the lower arm 33. The knuckle arm 31 is operatively coupled to the steering wheel 22 through a tie rod 35.

Figure 8:
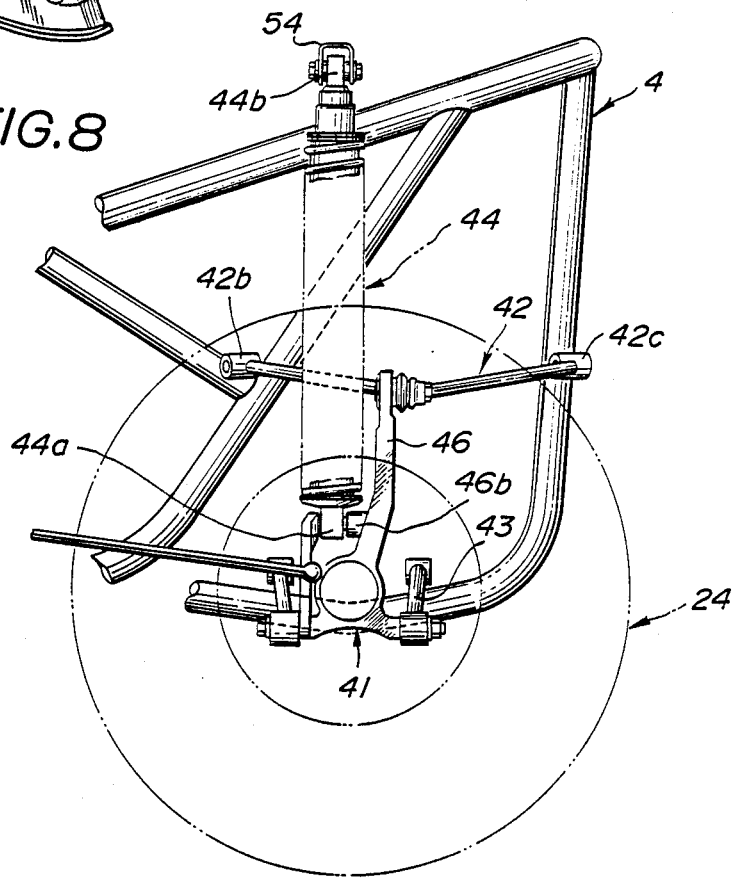
FIG. 8 is an enlarged fragmentary side elevational view of FIG. 5.
Figure 9:
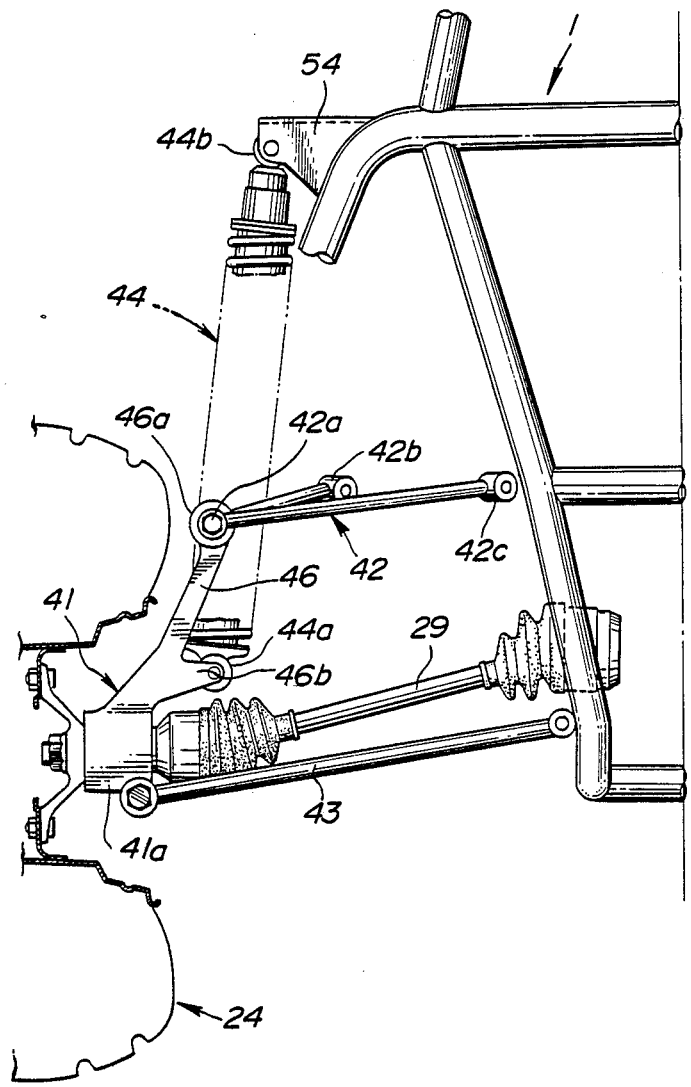
FIG. 9 is a fragmentary rear elevational view of the suspension illustrated in FIG. 8.

Each of the rear wheels 24 is rotatably supported by a knuckle 41 having an upward extension 46 with its upper end 46a pivotally connected to a vertex end 42a of an A-shaped upper arm 42 coupled to a rear portion 1b of the frame 1. The knuckle 41 also has a proximal end 41a to which two front and rear I-shaped lower arms 43 are pivotally joined. A hydraulic damper 44 has a lower end 44a pivotally connected to a vertically intermediate portion of the upward extension 46 of the knuckle 41. More specifically, as shown in FIGS. 8 and 9, the vertically intermediate portion of the extension 46 has a damper attachment arm 46b projecting toward the vehicle frame 1. The lower end 44a of the hydraulic damper 44 is pivotally coupled to a front surface of the damper attachment arm 46b. The hydraulic damper 44 has an upper end 44b connected to the frame 1 through a bracket 54. The hydraulic damper 44 is thus disposed in front of and substantially parallel to the extension 46 and lies on a line L1 (FIG. 6) which extends substantially parallel to a longitudinal central axis L of the frame 1. Therefore, it is not necessary to increase the space between the vehicle frame 1 and the rear wheel 24 for the installation of the hydraulic damper 44 therein.

A radius arm 45 has a front end 45a pivotally coupled to the frame 1 and a rear end 45b pivotally connected to a front portion of the proximal end 41a of the knuckle 41.

The rear portion 1b of the frame 1 comprises a pair of laterally spaced main pipes 2, a pair of laterally spaced seat side pipes 3, a pair of laterally spaced rear lower pipes 4, laterally spaced pairs of stiffener pipes 5, 6, and cross pipes 7, 8, 9. The main pipes 2 which extend longitudinally of the frame 1 are interconnected at their rear ends by a back pipe 2a. Each of the seat side pipes 3 extends downwardly of one of the main pipes 2 and has an upwardly inclined rear portion 3a with its rear end coupled to a rear end portion of the main pipe 2. The main pipe 2 and the seat side pipe 3 are coupled to each other by the vertical stiffener pipe 5 behind the driver's seat 21. The upwardly inclined rear portion 3a and the main pipe 2 are joined to each other by the inclined stiffener pipe 6. The upwardly inclined rear portions 3a of the laterally spaced main pipes 3 have lower portions joined to each other by the cross pipe 7, which has laterally spaced portions coupled to laterally spaced portions of the back pipe 2a by the rear lower pipes 4.

Figure 7:
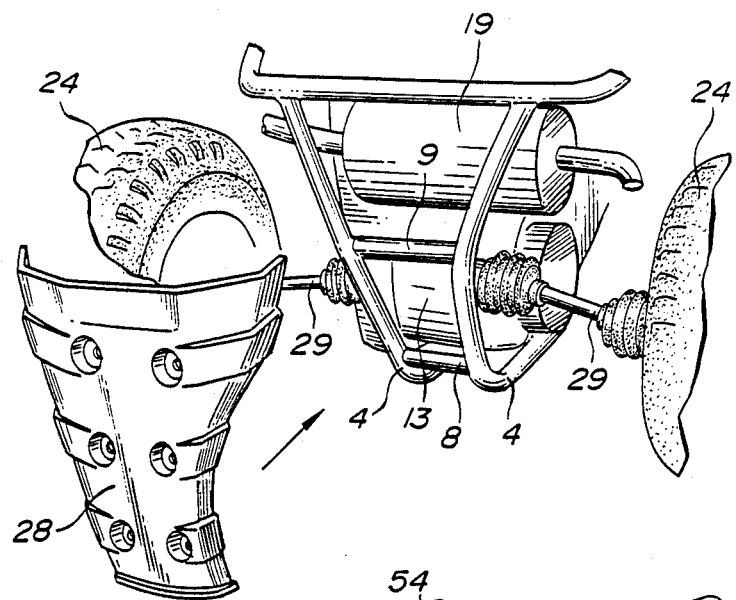
FIG. 7 is a fragmentary perspective view of a rear portion of the vehicle.

The laterally spaced rear lower pipes 4 have front portions 4a inclined progressively toward each other in the rearward direction, intermediate portions 4b closest to each other, and upward rear portions 4c. The intermediate portions 4b are interconected by the two cross pipes 8. The upward rear portions 4c are interconnected by the cross pipe 9, as shown in FIG. 7. A skid plate 28 of a unitary structure made of synthetic resin is attached to the upward rear portions 4c at their rear surfaces. The power unit is coupled to the rear wheels 24 through drive shafts 29.

As illustrated in FIG. 5 and 6, two front and rear channel-shaped brackets 51 fixed to each of the intermediate portions 4b of the rear lower pipes 4, and two front and rear channel-shaped brackets 52, 53 are fixed respectively to a lower portion of the stiffener pipe 6 joined to the upwardly inclined rear portion 3a of the seat side pipe 3 and an intermediate portion of the upward rear portion 4c of the rear lower pipe 4. The I-shaped lower arms 43 are pivotally connected to the lower brackets 51, respectively. To the upper brackets 52, 53 which are widely spaced apart from each other, there are pivotally connected the distal ends 42b, 42c of front and rear legs of the A-shaped upper arm 42. The front end 45a of the radius arm 45 is pivotally coupled to the joint between the seat side pipe 3 and the vertical stiffener pipe 5.

The I-shaped lower arms 43 are joined to the intermediate portion 4b of the rear lower pipe 4 near the longitudinal axis L of the vehicle frame 1. The distal end 42b of the front leg of the A-shaped upper arm 42 is coupled to the stiffener pipe 6 which is located laterally of the power unit on the frame 1. The distal end 42c of the rear leg of the A-shaped upper arm 42 is coupled to the upward rear portion 4c of the rear lower pipe 4 closely to the longitudinal axis L of the vehicle frame 1. With this arrangement, a line x (FIGS. 5 and 6) passing through the distal ends 42b, 42c of the front and rear legs of the A-shaped upper arm 42, and about which the A-shaped upper arm 42 is swingable, extends obliquely across the space in which the power unit is installed on the frame 1, as shown in FIG. 6.

Therefore, the upper arm 42 can swing through a large interval to give the rear wheel 24 an increased vertical stroke. The tread of the rear wheels 24 is reduced while providing a sufficient space for mounting the power unit on the rear portion of the frame 1. Since the span or distance between the distal ends 42b, 42c of the front and rear legs of the upper arm 42 is large, stresses imposed by the upper arm 42 on the frame 1 can be distributed or dispersed.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. An off-road vehicle comprising:
    a vehicle frame of piping;
    a power unit including an engine, a transmission, an intake and exhaust device, a fuel tank, and a battery;
    at least one rear wheel; and
    a suspension supporting said rear wheel on said vehicle frame, said suspension comprising:
    a knuckle by which said rear wheel is rotatable supported, said knuckle having a proximal end and an upward extension;
    said vehicle frame having a side frame member positioned laterally of said power unit and a rear frame member positioned rearwardly of said power unit;
    a lower arm assembly coupled between said proximal end of said knuckle and said side frame member of said vehicle frame; and
    an upper arm having a vertex end and two front and rear legs extending forwardly and rearwardly from said vertex end, said vertex end being pivotally coupled to said upward extension of said knuckle, said front leg being pivotally coupled to said side frame member, and said rear leg being pivotally coupled to said rear frame member.

2. An off-road vehicle according to claim 1, wherein said rear frame member includes a vertical pipe extending vertically near a longitudinal axis of said frame, said rear leg of said upper arm being pivotally coupled to said vertical pipe.

3. An off-road vehicle according to claim 1, wherein a line interconnecting said front and rear legs at pivotally coupled portions thereof and about which said upper arm is swingable with respect to said frame, extends obliquely across a rear portion of said frame on which said power unit is mounted.

4. An off-road vehicle according to claim 1, wherein said suspension includes a damper coupled between said knuckle and said side frame member, said damper being disposed in front of and substantially parallel to said upward extension of said knuckle and lying on a line extending substantially parallel to a longitudinal axis of said frame.

5. An off-road vehicle according to claim 4, wherein said damper has a lower end pivotally coupled to an intermediate portion of said upward extension of said knuckle.

6. An off-road vehicle according to claim 5, wherein:
    the intermediate portion of said upward extension of said knuckle has an attachment arm projecting therefrom and the lower end of the damper is pivotally coupled to the attachment arm.

* * * * *